US009626711B2

(12) United States Patent
Westphal

(10) Patent No.: US 9,626,711 B2
(45) Date of Patent: Apr. 18, 2017

(54) SYSTEMS AND METHODS FOR PROVIDING PRODUCT RECOMMENDATIONS INCORPORATING SECONDARY SOURCES OF INFORMATION

(71) Applicant: W.W. GRAINGER, INC., Lake Forest, IL (US)

(72) Inventor: Geoffry A. Westphal, Evanston, IL (US)

(73) Assignee: W.W. Grainer, Inc., Lake Forest, IL (US)

( * ) Notice: Subject to any disclaimer, the term of this patent is extended or adjusted under 35 U.S.C. 154(b) by 99 days.

(21) Appl. No.: 13/829,025

(22) Filed: Mar. 14, 2013

(65) Prior Publication Data

US 2014/0279193 A1    Sep. 18, 2014

(51) Int. Cl.
*G06Q 30/00*    (2012.01)
*G06Q 30/06*    (2012.01)

(52) U.S. Cl.
CPC .................. *G06Q 30/0631* (2013.01)

(58) Field of Classification Search
None
See application file for complete search history.

(56) References Cited

U.S. PATENT DOCUMENTS

| 2006/0129463 | A1* | 6/2006 | Zicherman ............. G06Q 30/02 705/14.73 |
| 2008/0250026 | A1* | 10/2008 | Linden et al. ................. 707/10 |
| 2009/0171755 | A1* | 7/2009 | Kane et al. .................... 705/10 |
| 2010/0325015 | A1* | 12/2010 | Westphal ....................... 705/27 |

\* cited by examiner

*Primary Examiner* — Jason Dunham
*Assistant Examiner* — Anand Loharikar
(74) *Attorney, Agent, or Firm* — Greenberg Traurig, LLP

(57) ABSTRACT

A system and method provides product/service recommendations by rendering and analyzing content on webpages that are linked to on a user's personal webpage. In this manner, the system and method compiles a more complete view of the user's interest and preferences, thus providing more effective and finely-attuned user recommendations.

3 Claims, 3 Drawing Sheets

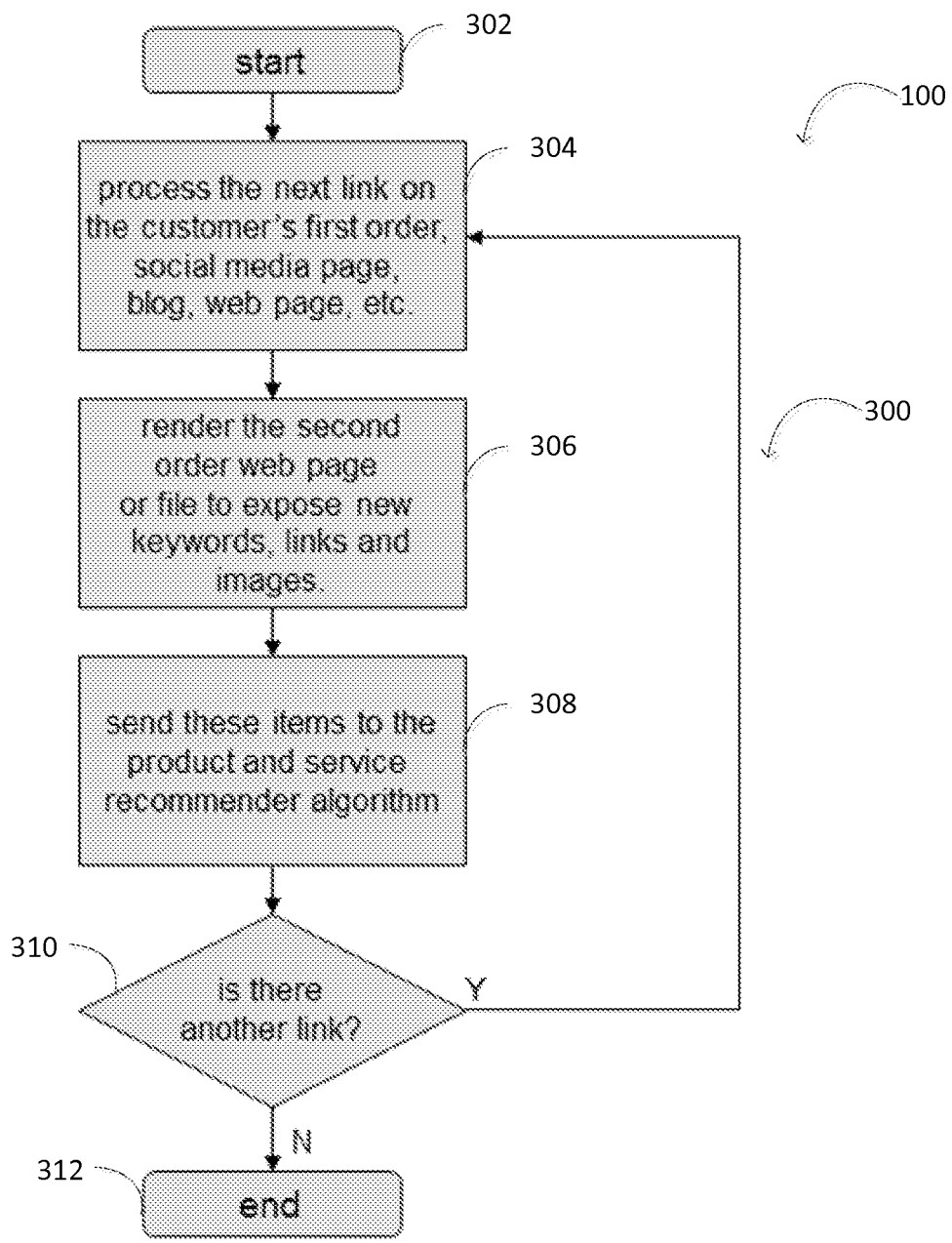

SYSTEMS AND METHODS FOR PROVIDING PRODUCT RECOMMENDATIONS INCORPORATING SECONDARY SOURCES OF INFORMATION

FIELD OF THE DISCLOSURE

The present description relates generally to systems and methods for providing product recommendations incorporating secondary sources of information.

BACKGROUND OF RELATED ART

Currently, e-commerce websites, whether business to business (B2B) or business to consumer (B2C), advertise their products in various ways. In particular, e-commerce websites commonly provide product recommendations that are tailored to a specific user/individual. These product recommendations may be based on, for example, a user's search history, browsing history, purchasing history, shipping history, geographic location, saved personal information, and other user information that may be collected by an organization. While these prior art systems and methods allow organizations to access superficial, or first-level demographic information about a user, they often do not provide in depth analysis into the user's interests, preferences, and personal beliefs.

In an attempt to overcome this problem, organizations have looked to a user's personal website, i.e., a social networking website, a professional profile, a personal blog, etc., for the purpose of gleaning additional information about the user. By its nature, a user's personal website may provide more complex and accurate personal information about the user because the personal website is user-created and edited. For example, an organization may use select keywords from a user's personal webpage in order to generate future product recommendations. But, even keywords taken from a personal webpage may be mistaken and/misinterpreted. In other words, the content of a personal webpage, standing alone, may not provide a full context for the keywords used in the personal webpage. Furthermore, because known searching capabilities are sometimes insufficient for finding relevant information within a user's personal website, existing product recommendation systems still often fail to provide recommendations that consider in-depth, fully accurate information about a user's interests and preferences even when information in a user's personal website is considered.

SUMMARY

Thus, while the background systems and methods identified herein generally work for their intended purpose, the subject invention provides improvements thereto, particularly by providing a system/method that collects information from a user's personal webpage, including second-level information obtained by using the links on the user's webpage, and that uses this collected information to create individualized product recommendations from a user.

BRIEF DESCRIPTION OF THE DRAWINGS

For a better understanding of the present disclosure, reference may be had to various examples shown in the attached drawings in which:

FIG. 3 illustrates in flow chart form a process for providing search results incorporating supply chain information in accordance with the present disclosure.

DETAILED DESCRIPTION

The following description of exemplary methods and apparatus is not intended to limit the scope of the description to the precise form or forms detailed herein. Instead the following description is intended to be illustrative so that others of skill in the art may follow its teachings.

The following discloses systems and methods for providing product recommendations that incorporate information gathered from a user's personal webpage, and in particular, information gathered by using links provided on a user's personal webpage. In general, the example methods and systems provide an organization with the ability to collect data about an individual user by mining information from that individual's personal webpage, i.e., a social networking page, a career networking page, an online biography, a blog, etc., in order to inform the organization's future product recommendations for that user. The organization may collect so-called "first-order information" from the personal webpage, including keywords from the webpage, images from the webpage, etc. The organization may also collect so-called "second-order information" from the personal webpage, in particular information (such as keywords and images) from webpages that are the subject of links that are displayed on the personal webpage. The second-order information may provide a more complete, holistic context related to the user's interest and preferences, thus allowing the system to provide more effective finely-attuned user recommendations. For example, second-order information on a linked to webpage may provide insight into the significance of certain first-order keywords that may otherwise be ambiguous or vague.

Figure 1:
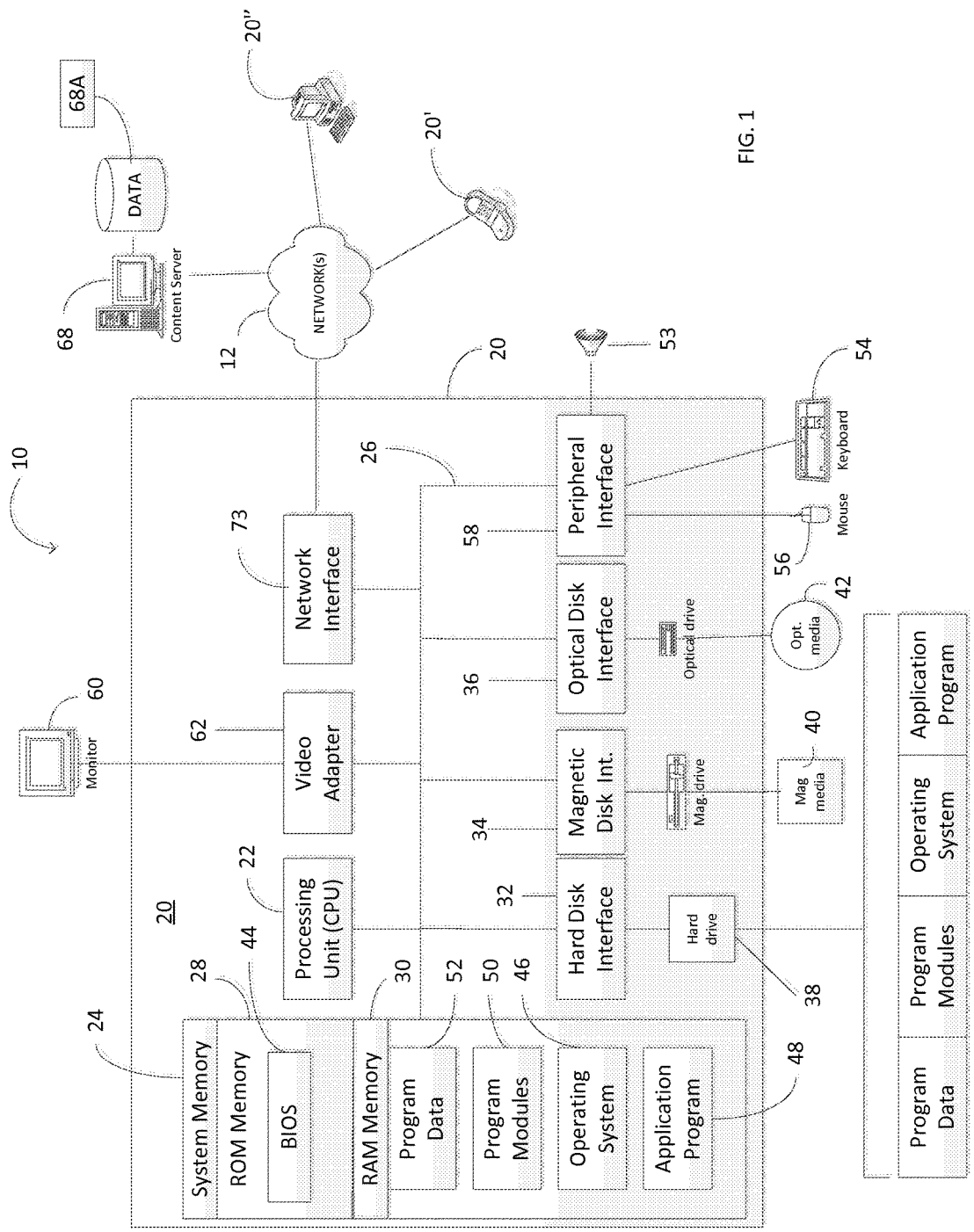
FIG. 1 illustrates in block diagram form components of an example, computer network environment suitable for implementing example cross referencing systems disclosed.

With reference to the figures, and more particularly, with reference to FIG. 1, the following discloses various example systems and methods for providing product recommendations to user on a processing device 20, such as a personal computer or mobile device, operating in a computer network. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, client, corporate shopper, buyer, consumer, etc., to access a host system server 68 and, among other things, be connected to an organization's hosted system, e.g., a website, mobile application, etc. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, a mainframe computer, a personal-digital assistant ("PDA"), a cellular telephone, a mobile device, a tablet, an e-reader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network and/or a cloud computing environment whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional non-transitory memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. The example data repository 68A may include any suitable data including, for example, a user's profile, user demographic information, a user's browsing history, a user's purchase history, first-order and second order information obtained from a user's personal webpage, etc. In this example, the data repository 68A includes a listing of an organization's products and services, and personal information collected for a user. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, systems related to geographical or mapping information, systems providing product information, social networking systems, etc.

For performing tasks as needed, the host system server 68 may include many or all of the elements described above relative to the processing device 20. In addition, the host system server 68 would generally include executable instructions for, among other things, storing information for providing product/service recommendations for a user, storing user profiles, etc.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
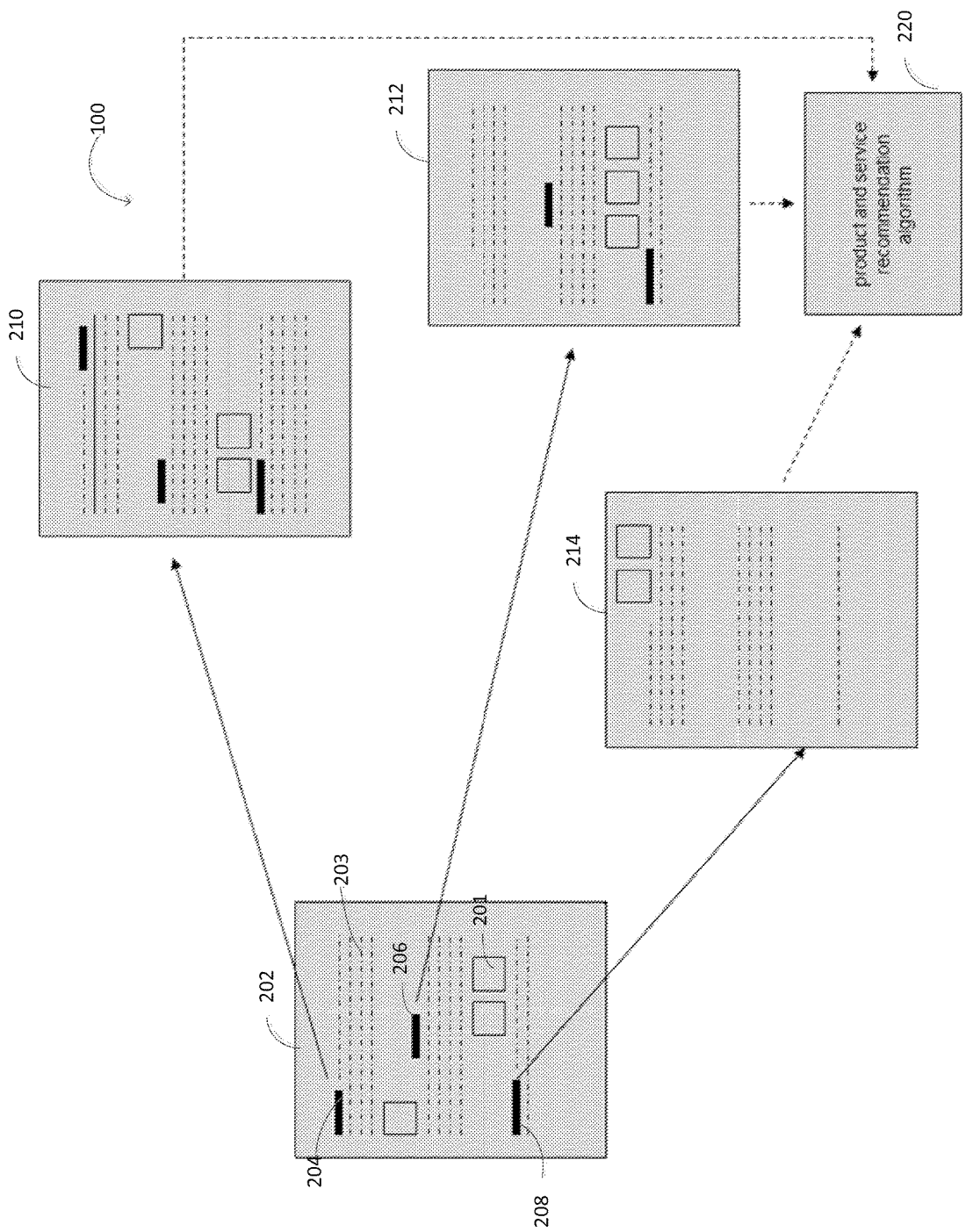
FIG. 2 illustrates an example personal webpage that a system may use to create personalized product recommendations in accordance with the present disclosure.

FIG. 2 illustrates an example personal webpage 202 including links to further webpages 210, 212, 214 that provide a product recommendation informational framework 100. In the illustrated example of FIG. 2, the webpage 200 is a webpage devoted to a specific individual, for example, a personal blog, microblog, social media profile, personal photostream, personal photosharing website, personal photo album, biography, professional networking website, professional profile, and/or any other website that is maintained by a particular person. The system may identify/locate the personal webpage 202 and the corresponding product recommendation informational framework 100 by searching the Internet, through a user's self-created profile, via a social networking system, via customer survey information, etc.

As shown in FIG. 2, the example personal webpage 202 comprises text 203, images 201, and secondary links 204, 206, 208. From the text 203, the system may identify certain keywords that may be used as keywords to create product recommendations via a product and service recommendation algorithm 220. Those keywords may be selected based on their relation to an organization (i.e., the keywords may be related to the organization's product/service offering), because of their prominence on the personal webpage 202 (e.g., considering their location on the webpage, the number of times utilized in the webpage, etc.), based on contextual clues from the personal webpage 202 (i.e., they may be directly identified as the user's "interests," "needs," "skills," "wish list," etc.) and/or based on any other appropriate criteria.

The system may also provide the service recommendation algorithm information as obtained from the images 201. To this end, the image information could be provided to an image recognition engine to thereby identify product, context, and/or the like contained within the image as disclosed in U.S. Published Application No. 2010/00325015, which publication is incorporated herein by reference in its entirety. As will be appreciated, the system may use any information gleaned from an image in this manner to further gather information about a user's interests, likes, preferences, geographic location, etc.

In accordance with the present disclosure, the system additionally functions to render the webpages 210, 212, 214 within the informational framework 100, wherein the webpages 210, 212, 214 are associated with the secondary links 204, 206, 208 in the webpage 202. Next, the system will draw content from the rendered secondary webpages 210, 212, 214 to feed into the product and service recommendation algorithm 220. As will be understood by one of ordinary skill in the art, the secondary links 204, 206, 208, and the content in the corresponding webpages 210, 212, 214 will provide additional information about an individual's interests, preferences, and product/service needs as well as information for providing context for the keywords identified on the personal webpage 202. Additionally, the system may draw information from keywords, images, links, and/or any other content contained in and/or linked to within the rendered secondary webpages 210, 212, 214 to any degree desired.

In an illustrative example, the personal webpage 202 may be a personal blog that documents the daily activities of an individual user/customer. The webpage 202 may contain the secondary link 204 which links to a webpage 210 related to a charitable organization. Rendering the secondary link 202 may reveal that the associated webpage 210 specifically refers to hurricane preparedness and disaster recovery in a specific geographic location, e.g., while the personal webpage 202 and even the link 204 itself (e.g., redcross.org/disaster) gives no indication of the subject matter of the webpage 210 the webpage 210 itself contains text, images, etc. that specifically mention or are otherwise specifically directed to "hurricanes." The information on the rendered webpage 210 may thus lead the product and service recommendation algorithm 220 to infer that the user is interested in products and services related to hurricane preparedness, disaster recovery simulations, etc.

In another illustrative example, the personal webpage 202 may depict the image 201 of a well-known car model. The recommendation algorithm 220, without further information, may simply infer that the user is interested in the depicted car, and the system may therefore make product/service recommendations related to the depicted car brand. Based on the image 201 alone, the product and service recommendation algorithm 220 may not know the reason behind which the user posted the image, e.g., cannot discern whether the user is interested in buying/leasing a new car, restoring classic cars, car racing, visiting car museums, and/or any other related interests. However, because the secondary link 206 corresponds to the webpage 212 and webpage 212 is devoted to an article related to classic car restoration, information extracted from the rendered secondary webpage 212, combined with the image 201, will lead the product/service recommendation algorithm 220 to conclude that the user is interested in restoring classic cars, rather than purchasing new cars, car racing, or visiting car museums. Thus, accessing information within the framework 100 will cause the system to provide more accurate recommendations, in this case for example providing recommendations relating to classic car parts, restoration tools and services, common interests groups, etc.

Although the preceding discussion has been directed to the recognition and analysis of text, images and hyperlinks on a personal webpage, one of ordinary skill in the art will recognize that the system may also utilize video content, metadata, tags, bookmarks, and/or any other relevant information that may found within the framework 100.

FIG. 3 is a flow chart that shows an example process 300 for collecting information that may be used in creating product/service recommendations in accordance with the described system that functions to search/traverse the framework 100. As shown, the method is initiated at a block 302, when the organization accesses a personal webpage 202, for example, when an organization identifies a publicly accessible user webpage, when a user connects with an organization via a social networking website, when a user associates his/her personal webpage with the user's organization account/profile, when the user identifies his/her personal webpage in a survey answer, and/or any other appropriate triggering event. At a block 304 the system processes the personal webpage 202 of the framework 100 by using a first link on the customer's personal webpage to render the second order webpage. At a block 306 the framework 100 renders the second order webpage and identifies text, images, video, metadata, hyperlinks and/or any other appropriate content. At block 308 the framework 100 sends the content identified on the second order webpage to the product/service recommendation algorithm. Next at block 310 the framework 100 determines whether the personal webpage has additional links to secondary web pages and, if so, the data collection process 300 returns to the block 304 to render the next secondary link and to collect content therefrom as described above. If the personal webpage does not have additional secondary link the data collection process ends. In a similar manner, a secondary webpage can be examined for links to still further webpages for the purpose of obtaining information from such other webpages as desired.

Although certain example methods and apparatus have been described herein, the scope of coverage of this patent is not limited thereto. For example, it will be understood that the interests of the user discerned using the system and method described herein could likewise be provided to the system described in U.S. Published Application No. 2020/0223063 (which application is incorporated herein by reference in its entirety) to thereby provide a reference collection that is personalized to the user, e.g., a listing of those links within an aggregation of links to sources of on-line information that have been mapped within the data repository to one or more consumer communities to which the consumer is discerned as being a part of based upon their discerned interests and/or based on products/services discerned as being of interest to the consumer. Thus, this patent covers all methods, apparatus, and articles of manufacture fairly falling within the scope of the appended claims either literally or under the doctrine of equivalents.

I claim:

1. A non-transitory, computer readable media having stored thereon instructions for providing recommendations related to a user, the instructions, when executed by a processing device, cause the processing device to perform steps comprising:

retrieving a first webpage associated with a user; and in response to the first webpage being retrieved, automatically locating a link to a second webpage in the first webpage, automatically using the link to retrieve the second webpage, automatically extracting from the retrieved second webpage an image, automatically providing the image extracted from the retrieved second webpage to an image recognition search engine to receive from the image recognition engine a keyword that is discerned by the image recognition search engine as being related to the image extracted from the retrieved second webpage, automatically utilizing the keyword received from the image recognition search engine to identify at least one product for presentation to the user, and automatically displaying in a display device a third webpage the at least one product as a product recommendation.

2. The computer-readable media as recited in claim 1, wherein the first webpage is one of a personal webpage, a blog webpage, a social media profile webpage, or a professional profile webpage.

3. The computer-readable media as recited in claim 1, wherein the instructions cause the processing device to present the third webpage to the user during a browsing session in which the user is recognized.

* * * * *